April 25, 1967 J. R. MONDT 3,315,729
PURGING SEAL
Filed Jan. 14, 1965

INVENTOR.
James R. Mondt
BY
Paul Fitzpatrick
ATTORNEY

United States Patent Office 3,315,729
Patented Apr. 25, 1967

3,315,729
PURGING SEAL
James R. Mondt, Warren, Mich., assignor to General Motors Corporation, Detroit, Mich., a corporation of Delaware
Filed Jan. 14, 1965, Ser. No. 425,458
2 Claims. (Cl. 165—9)

This invention relates to rotary regenerators, that is devices in which a porous annular body, called a matrix, rotates slowly so that each part of the matrix passes alternately through two spaces where it is exposed to gases at different temperatures and often at different pressures, the matrix carrying heat from the hotter to the cooler gas. In such devices, a seal is provided where the matrix passes from one space to the other through a diaphragm or bulkhead. Sealing is one of the difficult problems in such regenerators, particularly where there is a considerable pressure drop from one space to the other. The effective sealing of such devices also may be seriously hampered by displacement losses due to the carrying of gas from one space to the other within the porous structure of the rotating matrix. This rotation carry-over results in the contamination of the high pressure space with low pressure gas and of the low pressure space with high pressure gas. My invention is directed to an arrangement to eliminate the carrying over of gas by the matrix from the lower pressure space to the higher presure space. This is quite significant in installations where contamination of the higher pressure gas with the lower pressure gas should not be allowed.

Hence, the subject invention presents a self-purging seal assembly for use in connection with a rotary regenerator at the point where the rotary regenerator rotates from the low pressure space to the high pressure space, which purges the regenerator matrix to thereby eliminate rotation losses and contamination of the high pressure gas with the low pressure gas. This is accomplished by leaving a small leakage path between the stationary sealing means and the rotating sealing bars in the regenerator matrix so that high pressure gas flows through the leakage path from the high pressure space to the low pressure space and is caused to flow through the rotating matrix, thereby purging the matrix of the low pressure gas and eliminating the contamination of the high pressure space with low pressure gas.

Figure 1:
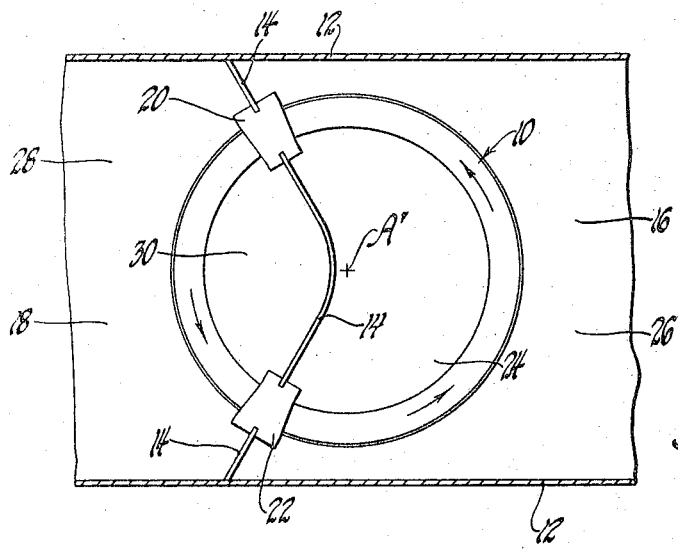
Figure 2:
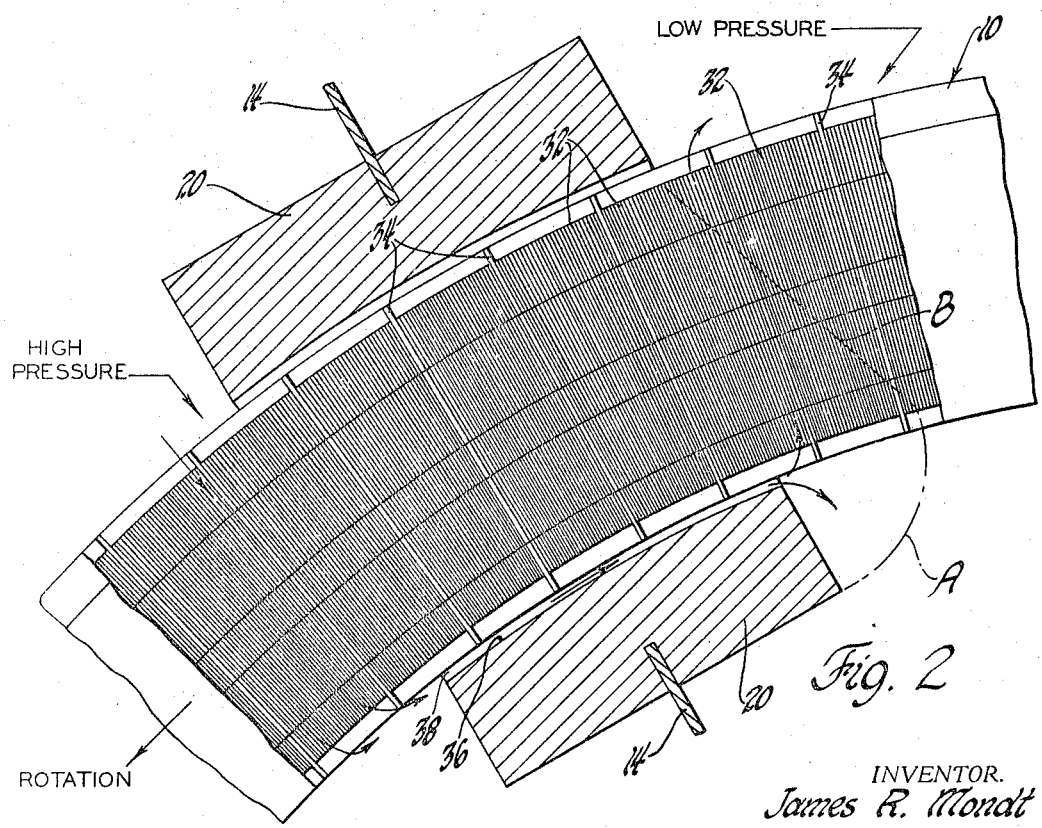

Other objects, features and advantages of the subject invention will become apparent upon reference to the following detailed description of an embodiment of the invention and the corresponding drawings, wherein:

FIGURE 1 is a rather schematic cut-away view of a rotary regenerator embodying the invention, the view being taken on a plane perpendicular to the axis of rotation; and FIGURE 2 is an enlarged sectional view of the subject regenerator seal assembly.

More particularly, FIGURE 1 shows the subject invention as embodied within a rotary regenerator including a matrix 10 which rotates about an axis A' and is suitably supported within a housing 12. For the purposes of our discussion, the matrix 10 will rotate in a counterclockwise direction as shown by the arrows on the drawings. A bulkhead 14 divides the volume within the housing 12 into two main plenums 16 and 18. Sealing means 20 and 22 are provided within the bulkhead 14 at the points where the matrix 10 rotates through the bulkhead so that the plenums 16 and 18 are sealingly separated. The plenum 16 contains hot, lower pressure gas which will enter the plenum 16 within the matrix 10 and pass from the space 24 through the matrix 10 to the outer space 26, thereby heating the matrix 10 as it rotates through the low pressure plenum 16. The high pressure plenum 18 contains cool higher pressure gas which enters the outer chamber 28 and passes through the matrix into the inner chamber 30 within the matrix 10. Hence, it can be seen that the heat of the hot gases is used to heat the matrix as it passes through the low pressure plenum 16 and that this heat is tranferred to the cooler higher pressure gas as the matrix 10 rotates through the high pressure plenum 18. It should be noted that it is immaterial to the invention which gas is hot and which is cool.

FIGURE 2 shows an enlarged view of the subject invention as embodied in the sealing means 20 and its relation to the matrix 10. It is to be remembered that the matrix 10 is rotating counterclockwise in FIGURE 2 and that the high pressure plenum 18 is located on the left of bulkhead 14 and the low pressure plenum 16 is located on the right. It should also be remembered that the lower pressure gases pass from the chamber 24 radially outward through the matrix 10 to the lower pressure chamber 26. It can readily be seen that a portion of the low pressure gas which passes from the chamber into the matrix 10 before the matrix rotates into the seal 20 will, under normal circumstances, be carried through the seal and delivered in the high pressure plenum 18. This movement of low pressure gas is referred to as a displacement loss and results in the contamination of the high pressure gas within the high pressure plenum 18. As mentioned previously, it is the object of the invention to eliminate this displacement loss and the resulting contamination.

The matrix 10 may be of any suitable type having a plurality of heat exchange segments 32 alternated with sealing bars 34. The heat exchange segments may be constructed of any suitable material, such as tightly packed layers of corrugated sheet metal, which provides radial flow paths with substantial heat exchange surface area. It is to be noted that the sealing bars 34 extend radially beyond both faces of the matrix 10, such that they normally are in sealing relation, as close as feasible to actual contact with the stationary seal 20. In the subject invention, the seal 20 is provided with an enlarged opening for the matrix so that a leakage path 38 is formed between the sealing bars 34 and the inner surface 36 of the sealing member 20. This leakage path 38 provides a means for the high pressure gas to flow to the low pressure plenum 16 in a direction opposite to the rotation of the matrix. Since the outer chamber 28 is at a higher pressure than the inner chamber 30, the high pressure gas is constrained to flow through the rotating regenerator 10 to the chamber 30. Then, since the chamber 30 is at a higher pressure than the chamber 24, the high pressure gas is forced to flow through the leakage path 38 to the chamber 24, and further since the chamber 24 is at a higher pressure than the chamber 26 the leakage high pressure gas and the lower pressure gas are constrained to flow radially outward through the regenerator 10 to the chamber 26. As the high pressure gas moves radially outward through the matrix 10 toward the chamber 26 it purges the low pressure gas from the rotating regenerator 10 before it can be rotated to the high pressure plenum 18. Hence, providing the leakage path for the high pressure gas to flow to the low pressure side of the seal results in the purging of the low pressure gas from the matrix to thereby avoid contamination of the high pressure plenum 18 and the gas contained therein.

The leakage path 38 should be calibrated with regard to the operating conditions so that there is no undue loss or waste. The quantity of the clean gas required to displace the contaminant gas from the matrix and the width of the clearance gas necessary to supply this amount may be determined by calculation or experiment. The action of the device may be clarified to some extent by consideration of the curved broken line A and the essentially straight broken line B on FIGURE 2, and the arrows which indicate flow. As indicated by the arrows, the clean gas flows radially inward through the matrix to the left of the seal 20, and a small part of it is forced through the clearance gap 38. This intentional leakage results in a zone of the clean gas approximately within the space indicated by the curved line A, where it comes between the upward flowing contaminant gas and the matrix. Because of the upward pressure drop through the matrix, this clean gas is forced through the matrix, expelling the contaminant gas ahead of it, the line of contact between the two gases being indicated generally by the line B. As will be apparent, if the flow of clean gas is insufficient, not all of the contaminant will be expelled. On the other hand, if an excess of clean gas is supplied, the line B will be moved toward the right and an undesirable quantity of the clean gas will be blown into the space 26 above the matrix. For best operation, a slight excess of the clean gas should be available within the space indicated by line A.

Hence, it can be seen that the subject invention provides a self-purging sealing assembly for a rotary regenerator which reduces the contamination resulting from losses at the seal where the rotary regenerator passes from the low pressure chamber to the high pressure chamber.

Although but one specific embodiment of the subject invention has been described and shown in detail, it should be clear to those skilled in the art to which this invention pertains that many changes and modifications may be made thereto without departing from the scope of the invention.

I claim:
1. A rotary regenerator comprising, in combination,
   a housing
   a bulkhead dividing the housing into two flow paths, a first flow path for a first fluid and a second flow path for a second fluid, the first fluid being at higher pressure than the second fluid
   a matrix rotatably mounted in the housing and rotating through said bulkhead, the matrix being disposed across both said flow paths so that both fluids flow through said matrix, one on each side of said bulkhead
   fixed seal means disposed in said bulkhead where the matrix moves from the second flow path into the first flow path
   the matrix and fixed seal means including means defining a labyrinth seal between the two flow paths at both the faces of the matrix through which the fluids flow
   the labyrinth seal at the face of the matrix which is upstream in the second path having a predetermined clearance sufficient to pass the first fluid from the first path to the second path along the said face of the matrix under the action of the pressure difference between the fluids in sufficient quantity to fill the matrix as it rotates through the seal
   the fluid so passed being carried into the matrix by the presure differential across the matrix in the second path to fill the matrix with the first fluid and purge the second fluid from the matrix in the second path immediately ahead of the fixed seal means.
2. A rotary regenerator as defined in cleam 1 in which the means defining the labyrinth seal includes seal bars projecting from the faces of the matrix into close proximity to the fixed seal means.

References Cited by the Examiner
UNITED STATES PATENTS

| 1,586,817 | 6/1926 | Ljungstrom | 165—8 |
| 1,652,025 | 12/1927 | Ljungstrom | 165—9 |
| 2,865,611 | 12/1958 | Bentele | 165—9 |

ROBERT A. O'LEARY, *Primary Examiner.*

A. W. DAVIS, *Assistant Examiner.*